United States Patent [19]

Willen et al.

[11] Patent Number: 4,853,515

[45] Date of Patent: Aug. 1, 1989

[54] PLASMA GUN EXTENSION FOR COATING SLOTS

[75] Inventors: William S. Willen, Huntington; Robert F. Savill, Jr., Flushing; Martin E. Hacker, Lake Ronkonkoma, all of N.Y.

[73] Assignee: The Perkin-Elmer Corporation, Norwalk, Conn.

[21] Appl. No.: 254,001

[22] Filed: Sep. 30, 1988

[51] Int. Cl.[4] .................................................. B23K 9/00

[52] U.S. Cl. ............................ 219/121.47; 219/76.16; 219/121.52; 219/121.5; 427/34; 239/81

[58] Field of Search ............ 219/76.16, 121.47, 121.5, 219/121.48, 121.49, 74, 75, 121.59; 239/13, 79, 81, 85; 427/34

[56] References Cited

U.S. PATENT DOCUMENTS

| | | | |
|---|---|---|---|
| 2,922,869 | 1/1960 | Giannini et al. | 219/75 |
| 3,740,522 | 6/1973 | Muehlberger | 219/121 P |
| 4,146,654 | 3/1979 | Guyonnet | 219/121.47 |
| 4,423,304 | 12/1983 | Bass et al. | 219/121.52 |
| 4,540,121 | 9/1985 | Browning | 219/121.47 |
| 4,561,808 | 12/1985 | Spaulding et al. | 406/118 |
| 4,596,918 | 6/1986 | Ponghis | 219/121 PM |
| 4,661,682 | 4/1987 | Gruner et al. | 219/121 PL |
| 4,681,772 | 7/1987 | Rairden, III | 427/34 |
| 4,696,855 | 9/1987 | Pettit, Jr. et al. | 428/312.8 |

*Primary Examiner*—M. H. Paschall
*Attorney, Agent, or Firm*—H. S. Ingham; E. T. Grimes

[57] ABSTRACT

A plasma gun for spraying in a recessed region comprises a cathode member and a tubular anode arranged with the cathode member to generate a plasma stream. An elongated tubular extension including a tubular wall with an axial plasma duct therein extends forwardly from the anode. A transverse plasma duct causes the plasma stream to exit transversely from the tubular extension. Channeling for fluid coolant is in the tubular wall and extends substantially the length of the axial plasma duct. A first external pipe connected to the tubular extension forwardly of the transverse duct directs fluid coolant to the channeling. A powder injector injects spray powder rearwardly into the exiting plasma stream. A second external pipe from a powder source is connected to the powder injector.

4 Claims, 2 Drawing Sheets

PLASMA GUN EXTENSION FOR COATING SLOTS

The present invention relates to plasma spray guns and particularly plasma spray gun extensions.

BACKGROUND OF THE INVENTION

Plasma flame generators and spray guns utilizing an electric arc and a flowing gas stream passed in contact with the arc are generally known and have been used successfully for commercial and experimental purposes. These devices generally consist of an electrode arrangement striking an arc therebetween, a nozzle and means for passing a stream of gas in contact with the arc and through the nozzle.

In plasma flame generators of the non-transfer type, the arc is struck between an electrode pair, one of which is in the form of a nozzle, and the gas stream is passed in contact with the arc and through the nozzle. U.S. Pat. No. 2,922,869 typifies the early designs for such plasma generators. In generators of the transferred arc type which are generally used as torches for cutting, welding, and the like, the arc generally extends from an electrode such as a rod electrode to the workpiece through a nozzle, while a gas stream is passed concurrently through the nozzle with the arc. Plasma flame spray guns, in principle, merely constitute plasma flame generators in which means are provided for passing a heat fusible material into contact with the plasma stream where it can be melted or at least softened and propelled onto a surface to be coated.

A variety of plasma spray gun configurations have been devised for spraying into confined areas. These have generally been designed to the problems of coating inside diameters of holes. They virtually all have limitations for minimum size hole associated with physical sizes of electrodes and the channeling of plasma-forming gas, coolant and powder feed, as well as required minimum spray distance.

For example U.S. Pat. No. 4,661,682 (Gruner et al) describes a plasma spray gun incorporated sideways on the end of an elongated arm. Size of confined area spraying, e.g. minimum diameter of the hole being coated, is limited by the necessary combined lengths of the cathode and anode structures. U.S. Pat. No. 3,740,522 (Muehlberger) discloses an elongated plasma gun with an angular nozzle anode used in conjunction with a cathode for deflecting a plasma stream from longitudinal to transverse to the initial main axis of the gun. This apparatus is similarly limited in minimum size by the configurations of the components, coolant channeling out and back, and powder conduits. U.S. Pat. No. 4,596,918 (Ponghis) discloses an elongated anode with concentric channeling for coolant on a plasma torch, but does not teach means for deflecting the spray stream or injecting powder. Various configurations for powder feeding are illustrated in U.S. Pat. Nos. 4,696,855 (Pettit et al) and 4,681,772 (Rairden).

Therefore the practicality of plasma spraying into confined regions remains elusive. A particular type of confined region of extensive interest is illustrated by the slotted regions for mounting blades and vanes on hubs in gas turbine engines. Such areas are subject to extensive fretting wear from vibrations and other stresses in the assemblies during engine operation. Plasma sprayed coatings have been developed which minimize such wear and can be used for repair of the components. These coatings have been used in the mounting slots but only where the slots are large or designed without overhangs so that a plasma spray stream can be directed from outside a slot onto the internal surfaces. However it is desirable to utilize dovetail slots to better retain the blades and vanes. Small dovetail slots are being designed into newer gas turbine engines. Heretofore small-type dovetail slots could not fully be coated. Also it is important for a coating to be sprayed nearly perpendicularly to the surface. Spraying from outside a slot onto side walls does not achieve this goal and results in inferior coatings.

SUMMARY OF THE INVENTION

Therefore, objects of the present invention are to provide an improved plasma gun useful for spraying on the inside surfaces of recessed regions, to provide a novel plasma extension spray gun, and to provide a plasma extension gun that is particularly useful for spraying on the inside surfaces of elongated slots.

The foregoing and other objects are achieved with a plasma gun comprising a cathode member and a tubular anode cooperatively arranged with the cathode member and with a source of plasma forming gas and an electrical arc power supply to generate a plasma stream issuing from the tubular anode. An elongated tubular extension including a tubular wall with an axial plasma duct therein extends forwardly from the anode. The plasma duct is terminated by an end wall distal from the anode. The tubular extension further has a transverse plasma duct therein formed in part by the end wall for causing the plasma stream to exit transversely from the tubular extension. Channeling for fluid coolant in the tubular wall extends substantially the length of the axial plasma duct. A first external pipe is connected to the tubular extension forwardly of a point proximate the transverse duct, the first pipe being in fluid flow communication with the channeling and receptive of fluid coolant from a coolant source. Disposal means disposes of the fluid coolant from the rearward end of the tubular extension. A powder injector is disposed forwardly adjacent the transverse duct to inject spray powder rearwardly into the exiting plasma stream. A second external pipe connected to the powder injector in powder flow communication therewith is receptive of the spray powder from a powder source.

DETAILED DESCRIPTION OF THE INVENTION

Figure 1A:
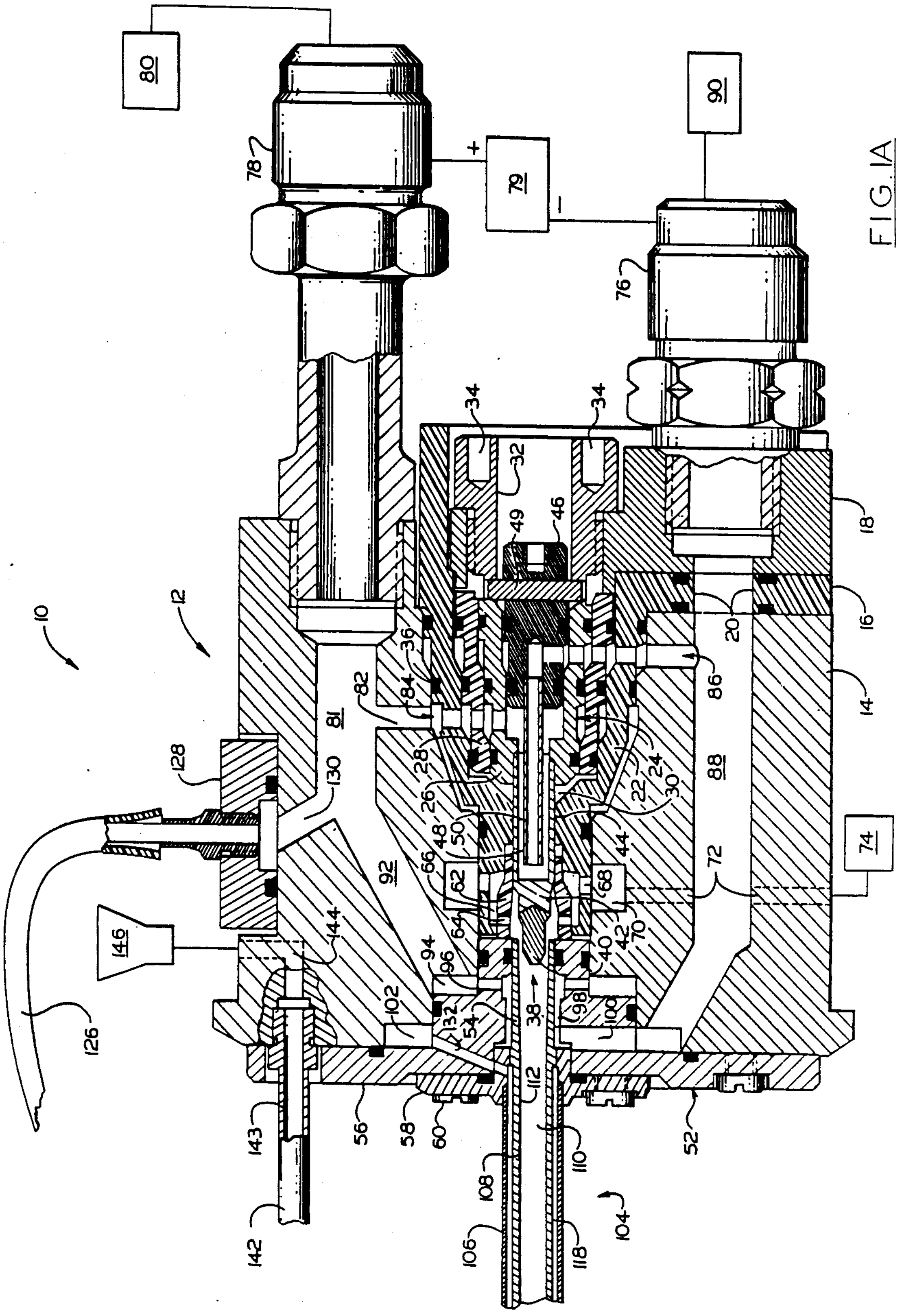
FIG. 1 is an elevation in cross section of a plasma gun according to the present invention.
Figure 1B:
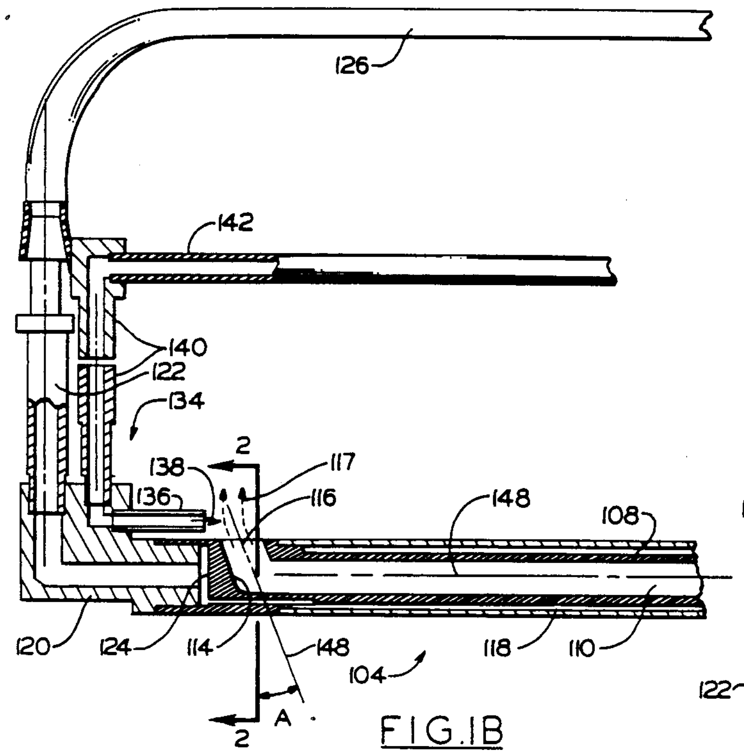

A plasma spray gun 10 incorporating the present invention is illustrated in FIG. 1. The plasma generating end 12 of the gun is of the conventional type. In the present example a main gun body 14 has affixed thereto and progressively rearwardly thereof a main insulator 16 and a cathode block 18. The main insulator has an outer portion 20 insulating the gun body from the cathode block and a generally cylindrical projection 22 extending forwardly into gun body 14. (The terms "forward" and "forwardly" as used herein and in the claims correspond to the direction of plasma gas flow in the gun; the terms "rear" and "rearwardly" indicate the opposite.)

A cathode assembly 24 is retained coaxially in main insulator 16 and electrode block 18. The assembly includes an electrically conducting cylindrical cathode holder 26. The assembly is fitted in a cylindrical insulator ring 28 which in turn is held in an axial bore 30 in forward projection 22 of main insulator 16. Cathode holder 26 is part of a rear retaining ring portion 32. These concentric components are retained in body 14 with a ring 32 being threaded into electrode block 18. Holes 34 in the ring facilitate wrench removal and replacement of the ring and assembly 24. A plurality of O-rings 36 are appropriately arranged in O-ring grooves throughout the gun to retain coolant.

A rod shaped cathode member 38 of assembly 24 has a forward tip 40 made of thoriated tungsten or other suitable arc cathode material. The tip is brazed to a cathode base 42 of copper or the like which has a rearwardly directed tubular portion 44 affixed with silver solder concentrically to cathode holder 26. A plug member 46 is fitted into the rear of cathode holder 26 and has protruding forwardly therefrom a pipe 48 extending into the tubular portion 44 of cathode base 42, defining an annular conduit 50 therebetween. Plug 46 is held with a pin 49 in rear retaining ring 32.

A nozzle anode assembly 52 fits into the forward end of main body 14 and includes a tubular anode 54 of copper or the like extending forwardly of cathode tip 40. A flanged anode holder 56 retains the anode on body 14 by means of a nozzle flange 58 held to the body with screws 60.

A gas distribution ring 62 is located concentrically outside of cathode member 38. One or more gas inlets 64 (preferably 6 inlets; two are shown) are directed radially inward, preferably with a tangential component to swirl the plasma gas. The inlets receive the gas flowing from an inner annular chamber 66 disposed outward of gas ring 62, a plurality of gas ducts 68, an outer annular chamber 70 and a gas duct 72 in body 14 connected to a source 74 of plasma forming gas. (Duct 72 preferably leads rearward in generator 12, but is shown transverse in FIG. 1 for clarity.)

A pair of electrical power cable connectors 76,78 from a conventional electrical arc power source 79 are threaded respectively into cathode block 18 and main body 14. These components and others not otherwise designated herein are made of brass or the like for ease of fabrication and conduction of current. Arc current thus flows from body 14 through anode holder 56 to anode 54 where an arc is formed to cathode member 38 thus generating a plasma stream in the plasma-forming gas. The current flow continues from the tip through the cathode base 42, retaining ring 32 and cathode block 18.

Fluid coolant, typically water, is provided from a pressurized source 80 through power cable 78 to a main channel 81 in main body 14. A first branch 82 from the main channel connects to a first series of concentrically arranged annular and radial channels 84 between and through main insulator 16, insulator ring 28 and cathode holder 26 to annular duct 50 for cooling cathode member 38. The cathode coolant then exits through pipe 48 and a second series of concentrically arranged annular and radial channels 86 to a fluid disposal channel 88 in main body 14 and out of the other power cable 76 to a drain 90 or, alternatively, to a heat exchanger for recirculation.

A second branch channel 92 from main channel 81 leads coolant to an annulus 94 between anode holder 56 and body 14 and thence through four radial channels 96 (one shown) to an annular coolant duct 98 about anode 54. The anode coolant then exits through a second channel 100 feeding to an annular chamber 102 formed between anode holder 56 and main body 14, to disposal channel 88.

According to the present invention, an elongated tubular extension 104 extends forwardly from anode 54. The extension is formed by a tubular wall structure, comprising an outer wall 106 and an inner wall 108, forming an axial plasma duct 110 extending forwardly from anode 54. The outer wall is silver soldered to nozzle flange 58. Preferably inner wall 108 is simply an extension of the tubular anode, i.e. has an inner surface 112 that is a continuation of a similar inner surface of the anode, so that the arc may seek a natural terminus on the smooth inner surface as far forward as possible, thereby maximizing power transfer to the plasma stream from the arc.

The forward end of plasma duct 110 is terminated by an end wall 114 distal of anode 54. At that distal location the tubular extension has a transverse plasma duct 116 therein formed in part by end wall 114 for diverting and exiting the plasma stream transversely from tubular extension 104. Although the transverse duct has a sufficient lateral component for plasma stream 117 to exit transversely, the duct (and issuing plasma) should retain a forward component to minimize hot gas erosion of the end wall and minimize heat loss to the end wall, and for other reasons explained below.

Channeling 118 for fluid coolant, between outer and inner walls 106,108, extends substantially the length of axial plasma duct 110, sufficient for flowing coolant such as water to cool the length of the plasma duct. The channeling may be in the form of a plurality of parallel bores in an otherwise solid tubular wall structure, but preferably is an annular space as described herein.

An end fitting 120 is provided at the forward end of extension 104, forwardly of transverse duct 116. An external pipe 122 is soldered to the end fitting and, in the present embodiment, leads transversely away from extension 104. Pipe 122 is in fluid flow communication with channeling 118 by way of a coolant region 124 proximate end wall 114, connecting to the channeling. External pipe 122 continues as a rigid pipe or a flexible hose 126 to a body fitting 128 communicating with a third branch channel 130 from main channel 81 source of coolant in main body 14 of gun 10. The coolant thereby is caused to flow through the external tube 122 to region 124 proximate transverse duct 116, rearwardly along channeling 118, and through a third radial channel 132 to chamber 102 and disposal channel 88.

A powder injector 134 comprising a short pipe 136 is disposed forwardly adjacent transverse duct 116 and aimed to inject spray powder 138 rearwardly into exiting plasma stream 117. A second external pipe 140 is connected to powder injector 134 in powder flow communication therewith. The second pipe leads via tubing 142 from a powder fitting 143 and a powder duct 144 in main gun body 14. (Duct 144 preferably leads rearward in generator 12, but is shown transverse in FIG. 1 for clarity.) The powder duct is receptive of spray powder, typically in a carrier gas, from a conventional powder source 146 such as of the type described in U.S. Pat. No. 4,561,808 (Spaulding et al), e.g. a Metco Type 4MP feeder sold by The Perkin- Elmer Corporation, Norwalk Conn. The powder is generally melted or at least heat softened and directed to a surface to be coated.

In a preferred embodiment as shown in FIG. 1, the rearwardly injected powder in its carrier gas enters the plasma stream near the exit of duct 116, with plasma stream 117 having a small forward component angle A such as 10° to 30°, e.g. 20° to a normal to the axis of the longitudinal duct. The injected powder-carrier stream 138 further deflects the plasma spray stream towards perpendicular. Suggested dimensions are 4 mm diameter for transverse duct 116, and 1.6 mm internal diameter for powder pipe 136.

Figure 2:
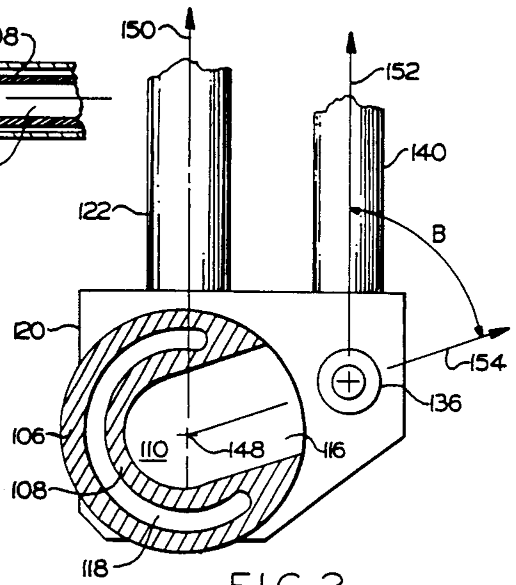
FIG. 2 is a cross section taken at 2—2 of FIG. 1.

For clarity FIG. 1 shows the external pipes 122 and 140 lying in the same plane as axis 148 of transverse duct 116. However, to allow spraying onto a surface, the transverse duct should be rotated on axis 148 with respect to the pipes. Thus, with reference to FIG. 2, with first external pipe 122 for coolant being connected via fitting 120 to tubular extension 104 from a first direction 150, the second external pipe 140 for powder being connected via fitting 120 to powder injector 136 from a second direction 152 preferably the same as (parallel to) the first direction, transverse duct 116 should exit in a third direction 154 arcuately spaced at an angle B from the first and second directions about the main axis of the extension. The arcuate spacing should be established as required for the recessed region to be sprayed, and is, for example, 60° in FIG. 2.

Figure 3:
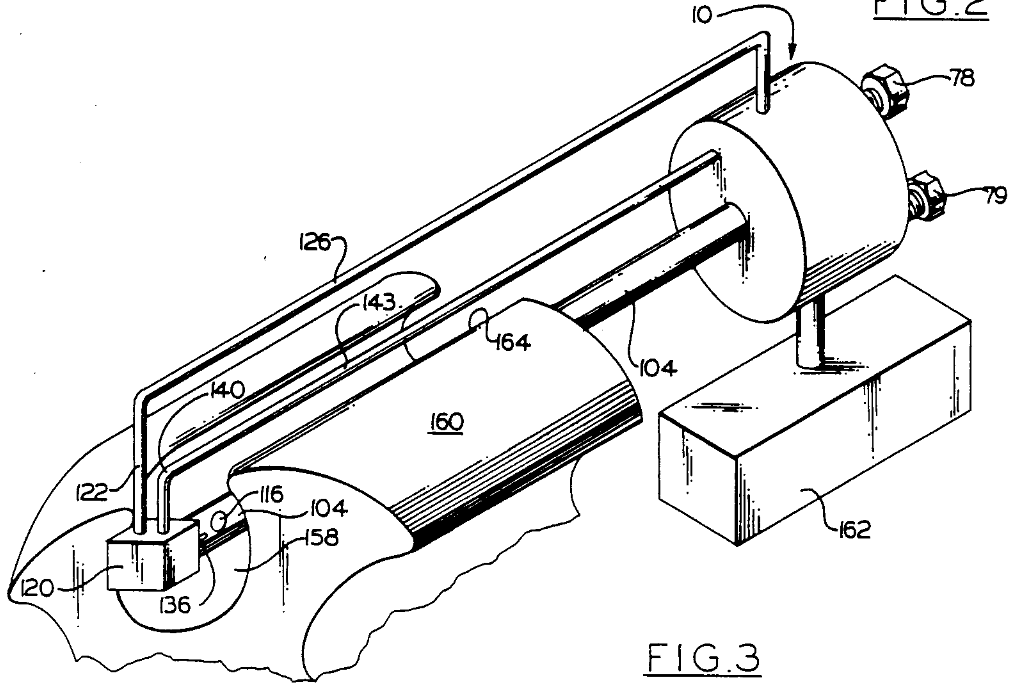
FIG. 3 is a perspective view of a gun according to FIG. 1 as used in spraying in a recessed region.

The plasma gun of the present invention is particularly suitable for spraying inside surfaces of a recessed region in the form of a dovetail slot 158 of a workpiece 160 accessible from at least one end of the slot as illustrated in FIG. 3. Examples of the kind of dovetail slots that may be coated are roots and connecting hub regions of turbine blades for gas turbine engines.

In operation the gun should be mounted on a machine 162 which oscillates the gun back and forth in the slot and rotates the gun by an indexed amount each cycle (or half cycle). Alternatively the part being coated may be moved. The total rotation for the embodiment shown is limited by the size of the slot opening 164 and the external coolant and powder pipes 122,140 extending therethrough, but should be sufficient for coating the otherwise inaccessible surfaces. A similar gun of opposite polarity of the transverse duct with respect to the pipes may be used for the other side of the slot, or the same gun may be inserted into the other end of the slot. The bottom surface of the slot may be coated conventionally.

A further embodiment (not shown) allows coating ordinary holes, as distinct from slots, where a hole is open at both ends. In such embodiment the pipes or end fitting should be readily removable from the tubular extension. Thus the gun, with pipes disconnected, may be inserted through the hole and the pipes reconnected. In such case it is necessary to provide an end fitting of length greater than the hole depth, or to extend the pipes longitudinally from the end fitting, to allow movement through the length of the hole. In either case the pipes are led back to the gun main body via whatever routing is necessary for the external geometry of the item being coated.

It is also quite practical within the present invention to provide the source of coolant and the source of powder to the extension directly without feeding either through the main body of the gun. Piping near the extension should be heat resistant and rigid to prevent contact with hot surfaces, but flexible tubing such as rubber held away from the heat may otherwise be utilized to allow the gun motions.

The extension should be long enough to spray the recess length intended, but not so long as to allow excessive cooling of the plasma stream. Higher melting powders may require a shorter extension with less heat loss. Some extra length may be obtained with an alternative construction (not shown) wherein the forward face of the main body is moved rearward so as to extend laterally from proximate the cathode tip, and the rear of the extension is configured as the anode.

A gun according to the present invention, with a plasma duct length of 12.5 cm from the cathode tip to the end wall (on axis), a plasma duct diameter of 4.0 mm, an extension outside diameter of 7.9 mm is suitable for spraying copper-nickel-indium powder having constituent weight ratios of 59:36:5 and a size of −44 +16 microns. Coatings up to 0.25mm thick may be sprayed in dovetail slots for vanes of a gas turbine engine, the slots being 3.8 cm long with a cross sectional diameter of 1.7 cm and a slot opening of 1.2 cm. Arcuate separation angle B of the transverse duct from the external pipes (FIG. 2) was 60°. Plasma gas was a mixture of argon at 708 l/hr (25 scfh) and nitrogen at 708 l/hr (25 scfh); the gun was started on neat argon at 1416 l/hr (50 scfh). Arc current was 400 amperes at 70 volts. Power loss to the cooling water was 72% of the power input, so output power was 7.8KW. Spray distance was 0.64 cm, and powder feed rate in argon carrier gas was 1.5 kg/hr. Suitable coatings for the purpose of dovetail slots were obtained, and the gun can be operated at least 10 hours without excessive erosion of the end wall.

The present invention allows spraying in such slotted regions, since the combination of removing the plasma generating cathode-anode assemblies from the plasma duct, and external pipes for the coolant and the powder, allow for a much smaller extension diameter for the plasma stream than heretofore achieved. Improved flexibility is also achieved for spraying into larger areas. Furthermore the coolant input from the end of the extension provides for optimum cooling of the end wall where the impinging plasma stream could otherwise cause excessive erosion. Further optimization is provided for powder injection into the plasma, being at an oblique angle from a direction with respect to the stream such as to have an injection component against the stream, to effect good entrainment and push the plasma spray stream closer to a perpendicular spray angle.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A plasma gun useful for spraying on the inside surfaces of a recessed region, comprising, in combination:

a cathode member;

a tubular anode cooperatively arranged with the cathode member and with a source of plasma forming gas and an electrical arc power supply to generate an plasma stream issuing from the tubular anode;

an elongated tubular extension including a tubular wall with an axial plasma duct therein extending forwardly from the tubular anode, the plasma duct being terminated by an end wall distal from the tubular anode, the tubular extension further having a transverse plasma duct therein formed in part by the end wall for causing the plasma stream to exit transversely from the tubular extension, with channeling for fluid coolant being in the tubular wall and extending substantially the length of the axial plasma duct;

a first external pipe connected to the tubular extension forwardly of a point proximate the transverse duct, the first pipe being in fluid flow communication with the channeling and receptive of fluid coolant from a coolant source;

disposal means for disposing of the fluid coolant from the rearward end of the tubular extension;

a powder injector disposed forwardly adjacent the transverse duct to inject spray powder into the exiting plasma stream; and a second external pipe connected to the powder injector in powder flow communication therewith and receptive of the spray powder from a powder source.

2. A plasma gun according to claim 1 wherein the axial plasma duct has a central axis, the first external pipe is connected to the tubular extension from a first direction with respect to the axis, the second external pipe is connected to the powder injector from a second direction proximate the first direction, and the transverse duct is oriented to cause the plasma stream to exit in a third direction arcuately spaced about the axis from the first and second directions.

3. A plasma gun according to claim 1 wherein the first external pipe is connected to the tubular extension forwardly of the transverse duct.

4. A plasma gun according to claim 1 wherein the transverse duct terminates substantially in the tubular wall.

* * * * *